UNITED STATES PATENT OFFICE.

GIUSEPPE FACCIOLI, OF PITTSFIELD, MASSACHUSETTS, ASSIGNOR TO GENERAL ELECTRIC COMPANY, A CORPORATION OF NEW YORK.

SYSTEM OF DISTRIBUTION.

1,208,530.  Specification of Letters Patent.  Patented Dec. 12, 1916.

Application filed April 27, 1915. Serial No. 24,332.

*To all whom it may concern:*

Be it known that I, GIUSEPPE FACCIOLI, a citizen of the United States, residing at Pittsfield, in the county of Berkshire, State of Massachusetts, have invented certain new and useful Improvements in Systems of Distribution, of which the following is a specification.

My present invention relates to electrical distribution systems and more particularly to alternating current systems of distribution in which high potentials are employed.

The object of my invention is to provide a method of and means for protecting such systems from the effects of high frequency disturbances which may be produced therein and for preventing the production of such disturbances when the source of power or other apparatus is connected to or disconnected from the distribution system.

It has heretofore been proposed to insert permanently in series with the line conductors of alternating current distribution systems inductances in parallel with high resistances. The inductances employed should have such values that they will offer substantially no impedance to the passage of the normal current in the system but will offer a large impedance to high frequency disturbances. With this arrangement the greater part of the high frequency current passes through the resistance, a large part of its energy is dissipated therein and the undesirable current is quickly damped out without injuring the apparatus connected to the transmission system. In carrying my invention into effect I make use of this protective effect of an inductance in parallel with a high resistance and at the same time prevent the production of severe high frequency disturbances in the system during switching operations. I accomplish this when connecting the generating or other apparatus to the transmission system by first closing the line circuit through the high resistance and then through the inductance. In disconnecting the generating apparatus the operation is reversed.

My invention will be best understood by reference to the following description taken in connection with the accompanying drawing in which I have illustrated diagrammatically a distribution system comprising an alternating current generator 1, line conductors 2 and a switch 3, for connecting the generator to the line conductors. The switch 3 is so arranged that in connecting the generator to the transmission line contacts 4 are first closed whereby the generator is connected to the line conductors through the resistances 5. In case no resistance was employed there would be a heavy charging current flowing from the generator to the line at the instant the connection is made by reason of the capacity between the conductors which is represented by the condenser 6. This charging current will in many cases cause a high frequency disturbance the voltage of which may rise to such a value as to injure the generator. When, however, the generator is first connected to the line through the high resistances 5 the value of this charging current is greatly reduced and the production of high voltage high frequency disturbances is prevented. After the contact has been made at 4 and the generator potential applied to the line the switch is thrown over to make a second contact with the points 7. This connects the inductances 8 in parallel with the resistance 5. These inductances 8 are of such a value that they offer little impedance to the normal working currents on the line but offer a high impedance to high frequency currents. As a result any high frequency disturbance produced in the system as a result of an atmospheric discharge or the switching of apparatus passes through the resistance 5. The value of such a current is thereby reduced and a large part of its energy is used up in the resistances.

In disconnecting the generator from the line the contact is first broken at 7 thereby reducing the value of the line current, and when contact is finally broken at 4 the value of the current which is thus interrupted is so small that no injury to any part of the system can occur.

While I have illustrated the application of my invention to the connection of a single phase generator to the line it will be apparent that it may equally well be employed with polyphase generators and that it may also be of utility for protecting or switching any apparatus employed in the distribution system.

What I claim as new and desire to secure by Letters Patent of the United States, is:—

1. The combination in a system of distribution of an alternating current generator, G. FACCIOLI.
SYSTEM OF DISTRIBUTION.
APPLICATION FILED APR. 27, 1915.
1,208,530.
Patented Dec. 12, 1916.
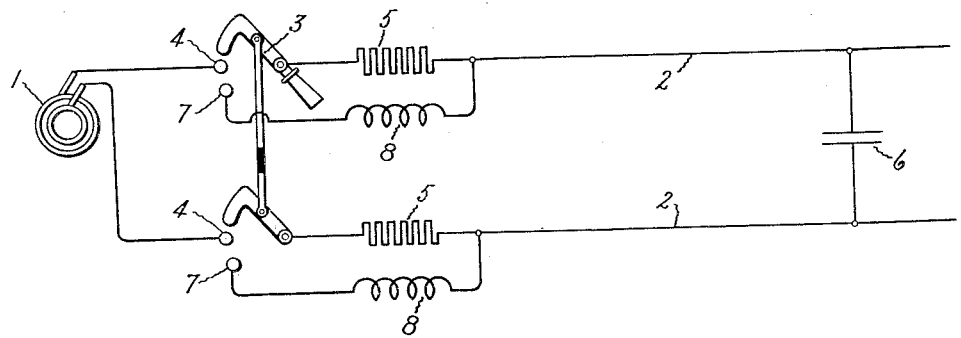
Inventor:
Giuseppe Faccioli,
by Albert G. Davis
His Attorney.